(12) United States Patent
Sakai

(10) Patent No.: US 8,575,983 B1
(45) Date of Patent: Nov. 5, 2013

(54) WAVEFORM GENERATION CIRCUIT FOR A WAVEFORM GENERATOR

(75) Inventor: Ryoichi Sakai, Shizuoka (JP)

(73) Assignee: Tektronix, Inc., Beaverton, OR (US)

(\*) Notice: Subject to any disclaimer, the term of this patent is extended or adjusted under 35 U.S.C. 154(b) by 0 days.

(21) Appl. No.: 13/560,931

(22) Filed: Jul. 27, 2012

(51) Int. Cl.
*H03K 5/01* (2006.01)

(52) U.S. Cl.
USPC ........... 327/166; 327/129; 327/164; 327/261; 327/265

(58) Field of Classification Search
USPC .................. 327/164, 166, 261, 265
See application file for complete search history.

(56) References Cited

U.S. PATENT DOCUMENTS

| 4,590,432 A * | 5/1986 | di Borgoricco ............... 327/175 |
| 4,956,798 A | 9/1990 | Dinteman |
| 6,486,827 B2 | 11/2002 | Small |
| 7,050,000 B2 | 5/2006 | Weals et al. |
| 7,196,658 B2 | 3/2007 | Inatsune |
| 7,340,357 B2 | 3/2008 | Ammerman et al. |
| 7,385,543 B2 | 6/2008 | Jungerman |
| 2007/0067123 A1 | 3/2007 | Jungerman |

\* cited by examiner

*Primary Examiner* — John Poos
(74) *Attorney, Agent, or Firm* — William K. Bucher

(57) ABSTRACT

A waveform generator has a waveform generation circuit storing waveform data for an analog waveform signals having dead time periods without the need for storing data on the dead time. A sequencer having a sequence memory stores sequence data that controls the sequencing of one or more signal components and associated dead times of the analog waveform signal. The timing of the dead time is controlled by a sampling clock and a wait time counter. The generation of the signal components is controlled by the sampling clock controlling the generation of addresses for a waveform memory storing digital data of the sampling components. The waveform memory digital data is converted to an analog waveform signal.

15 Claims, 11 Drawing Sheets

SEQUENCE TABLE 1

| LINE | CH1 | REPEAT |
|---|---|---|
| 1 | ST1.WFM | N1=T1/S1 (INTEGER) |
| 2 | P1.WFM | 1 |
| 3 | ST2.WFM | N2=T2/S2 (INTEGER) |
| 4 | P2.WFM | 1 |
| 5 | ST3.WFM | N3=T3/S3 (INTEGER) |
| 6 | P3.WFM | 1 |
| 7 | ST4.WFM | N4=T4/S4 (INTEGER) |
| 8 | P4.WFM | 1 |

FIG. 5
(Prior Art)

SEQUENCE TABLE 2

| LINE | CH1 | WAIT | REPEAT |
|---|---|---|---|
| 1 | P1.WFM | T1 | 2 |
| 2 | P2.WFM | T2 | 1 |
| 3 | P3.WFM | T3 | 1 |
| 4 | P4.WFM | T4 | 1 |

FIG. 11

WAVEFORM GENERATION CIRCUIT FOR A WAVEFORM GENERATOR

BACKGROUND OF THE INVENTION

Radio Frequency (RF) transmissions are becoming widely used in various fields. Because of advances in semiconductor technologies, an arbitrary waveform generator (AWG) now features 10G samples per second or more, which allows the AWG to generate a microwave signal directly without up-converters. For example, the AWG7122C arbitrary waveform generator, manufactured by Tektronix, Inc., Beaverton, Oreg., has a maximum sampling rate of 24 Giga-sample per second. One of applications of such an AWG is the generation of a radar signal. A typical radar signal is an RF (radio frequency) pulse train as shown in FIG. 1.

An ultra-high speed sampling rate is required to generate microwave signals, which makes the waveform data very large thus requiring a large size of a waveform memory to store data. For instance, 10G words of waveform memory are required to generate one second waveform at 10 G sample/second.

FIG. 2A is an example of a simplified radar signal. Each trapezoid of P1 to P4 represents a set of RF pulses and each of T1 to T4 shows a dead time. Note that each T1 to T4 dead time has no signal but the timing information of these components is very important because the range information on a target object will be included in the reflected signal from the object. FIG. 2B is a zoomed version of the simplified radar signal of FIG. 2A. FIG. 2B shows that each RF component, such as one of P1 to P4, includes a plurality of pulses and is defined by the duration of the pulses.

FIG. 3 is a block diagram of a conventional waveform generation circuit used in an AWG. Waveform data such as radar signal data are stored in waveform memory 52 and provided to a digital to analog converter (DAC) 54 under sequence control of a sequencer 50 including a sequence memory 48. The DAC 54 receives a sampling clock Fs from a clock generator 56 that defines the sampling rate. The DAC 54 provides an analog waveform signal to an output circuit 58 that has re-construction filters, amplifiers and attenuators to obtain an analog signal having desired bandwidth and amplitude. A CPU (not shown) controls operation of the blocks.

The simplified radar signal of FIG. 2A may be divided into some components that are stored as digital data in a waveform memory 52 of the waveform generation circuit 31. FIG. 4 shows the components of the simplified radar signal wherein the RF components P1 to P4 of FIG. 2 are left as they are in the memory 52 but the dead time components of T1 to T4 are squeezed into ST1 to ST4 components respectively. For example, the dead time components of T1 may be provided by repeating ST1 n1 times, or T1=ST1*n1.

FIG. 5 is an example of a sequence table 1 based on the example of FIG. 4. The sequence memory 48 store the sequence table 1 and the sequencer 50 controls the waveform memory 52 to provide waveform data "*.wfm" to the DAC 54 according to the sequence table 1. This method uses the waveform memory even when the RF pulses are not generated and then requires a large memory space.

SUMMARY OF THE INVENTION

The present invention is a waveform generation circuit having improved sequence control for generating a waveform output signal, such as a pulse train radar signal having signal components and dead times. A waveform memory stores waveform data of the signal components but not the dead time data. A sequence memory provides sequence control data for signal components and associated dead times to address, wait, signal component length and repeat counters through respective registers. The wait counter counts a sampling clock for a wait time based on sequence control wait time data for a selected signal component and dead time combination while the address counter provides the an initial address based on sequence control address data representing the initial address of the first waveform data of the signal component in the waveform memory. The sequence control wait time data defines the duration of the dead times. The wait counter controls the address counter and the signal component length counter by generating a "start of signal component" output. The address counter initiates the incrementing of addresses from the address counter for the output of waveform data of the selected signal component after the dead time. The signal component length counter initiates the counting of the sampling clock for the duration of the selected signal component and produces an "end of signal component" output for stopping the address counter and incrementing a count in the repeat counter. The repeat counter receives repeat number data as the sequence control data and the "end of signal component" output and generates and output to load new sequence control data to the address, wait, signal component length and repeat counters when the incrementing count in the repeat counter matches the repeat number data.

The objects, advantages and novel features of the present invention are apparent from the following detailed description when read in conjunction with appended claims and attached drawings.

BRIEF DESCRIPTION OF THE DRAWINGS

FIG. 5 is an example of a conventional sequence table used in a sequence.

FIG. 11 shows an example of a sequence table that the sequence memory may store.

DETAILED DESCRIPTION

Figure 6:
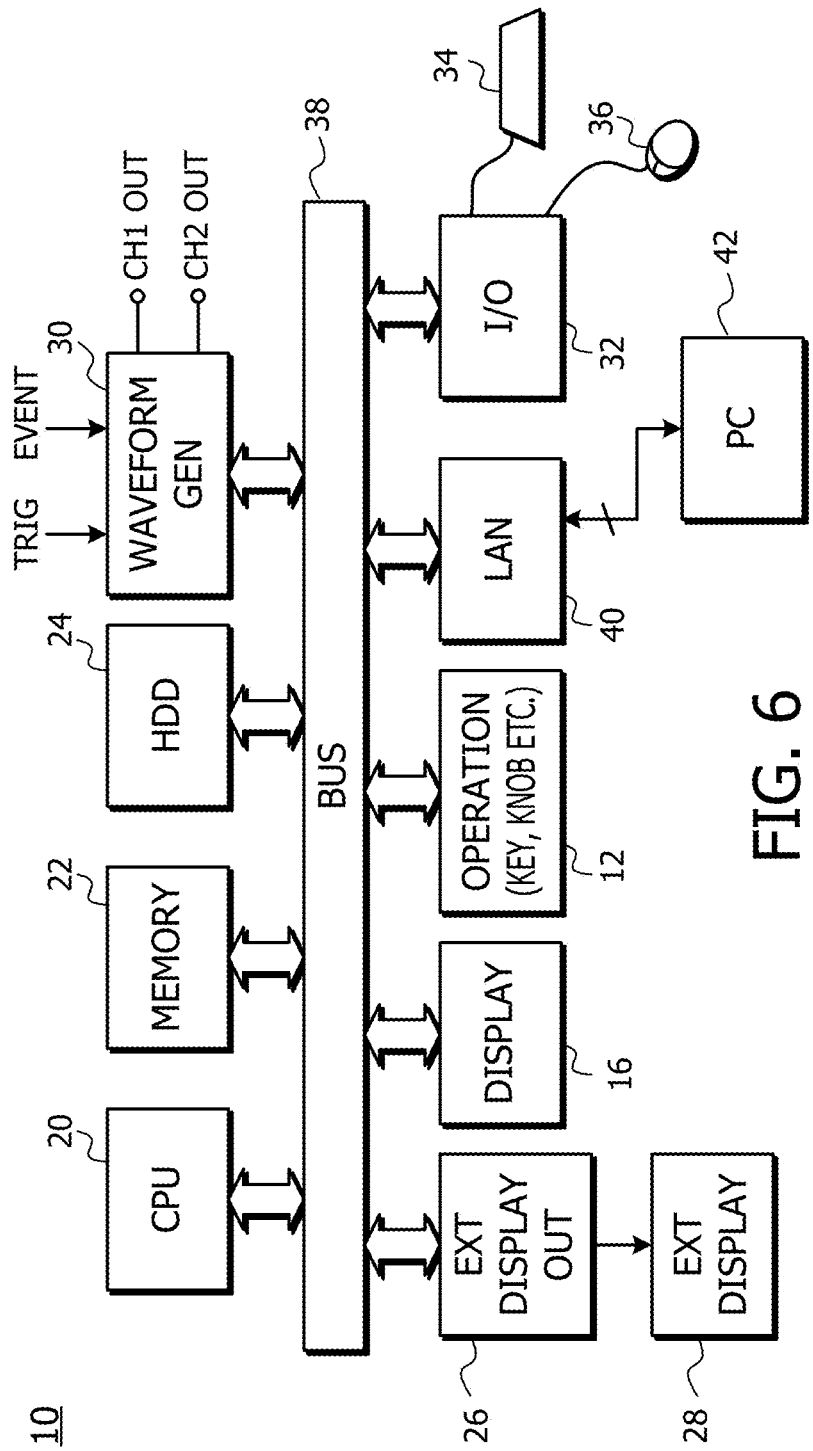
FIG. 6 is a typical representative block diagram of an arbitrary waveform generator used for an embodiment according to the present invention.

With reference to FIG. 6, there is shown a representative block diagram of an arbitrary waveform generator 10. The signal generator 10 has a central processing unit (CPU) 20 that controls the operation of the instrument according to programs stored on a hard disk drive (HDD) 24. A memory 22, such as RAM memory, is used for a work area for the CPU 20 to read programs from the storage device 24. A user can set up the signal generator to generate an output test signal via the button, knobs and the like 12 disposed on a front panel of the instrument. The display device 16 provides the user interface for visualizing the information relating to signal patterns and user settings of the output test signal. An external display output circuit 26 provides a video output which may be connected to an external display 28 for providing a larger display area in addition to the built-in display 16 of the signal generator. A waveform generation circuit 30 generates the output test signal based on user defined parameters. In this example, the waveform generator circuit has two channel outputs and inputs for trigger and event signals. An input/output port 32 is used for connecting an external keyboard 34, a pointing device, such as a mouse 36, and the like to the signal generator. The external keyboard 34 and/or mouse 36 may be included as part of the front panel controls of the signal generator. The blocks are coupled together via a signal and data bus 38. The bus 38 of the signal generator may have a Local Area Network (LAN) interface 40 for connecting the signal generator to an external controller, such as a personal computer (PC) 42. The LAN interface 40 allows the user interface to operate on the PC 42 and pass output signal data to the signal generator 10 and also enables the PC 42 to control the signal generator 10 over a network.

Figure 1:
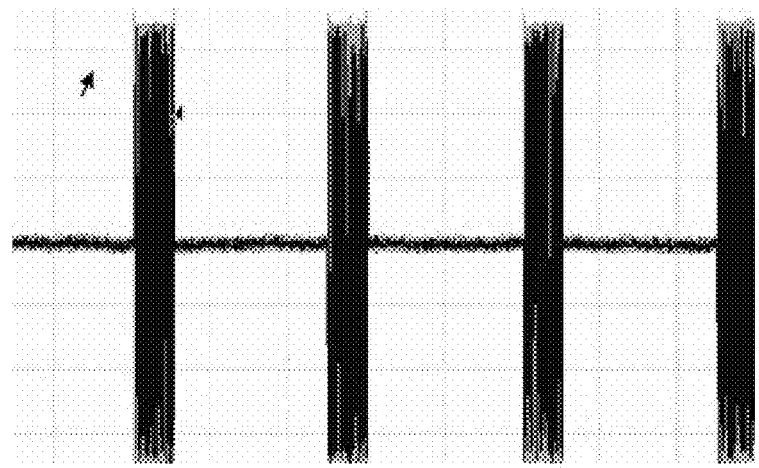
FIG. 1 is a waveform example of a radar signal.
Figure 2A:
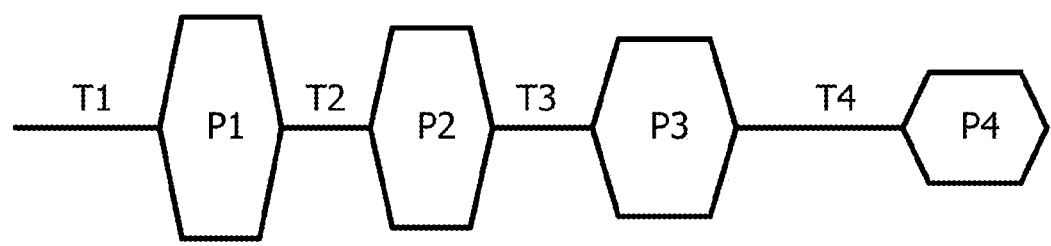
FIG. 2A is an example of a simplified radar signal and FIG. 2B is a zoomed version of the simplified radar signal.
Figure 2B:
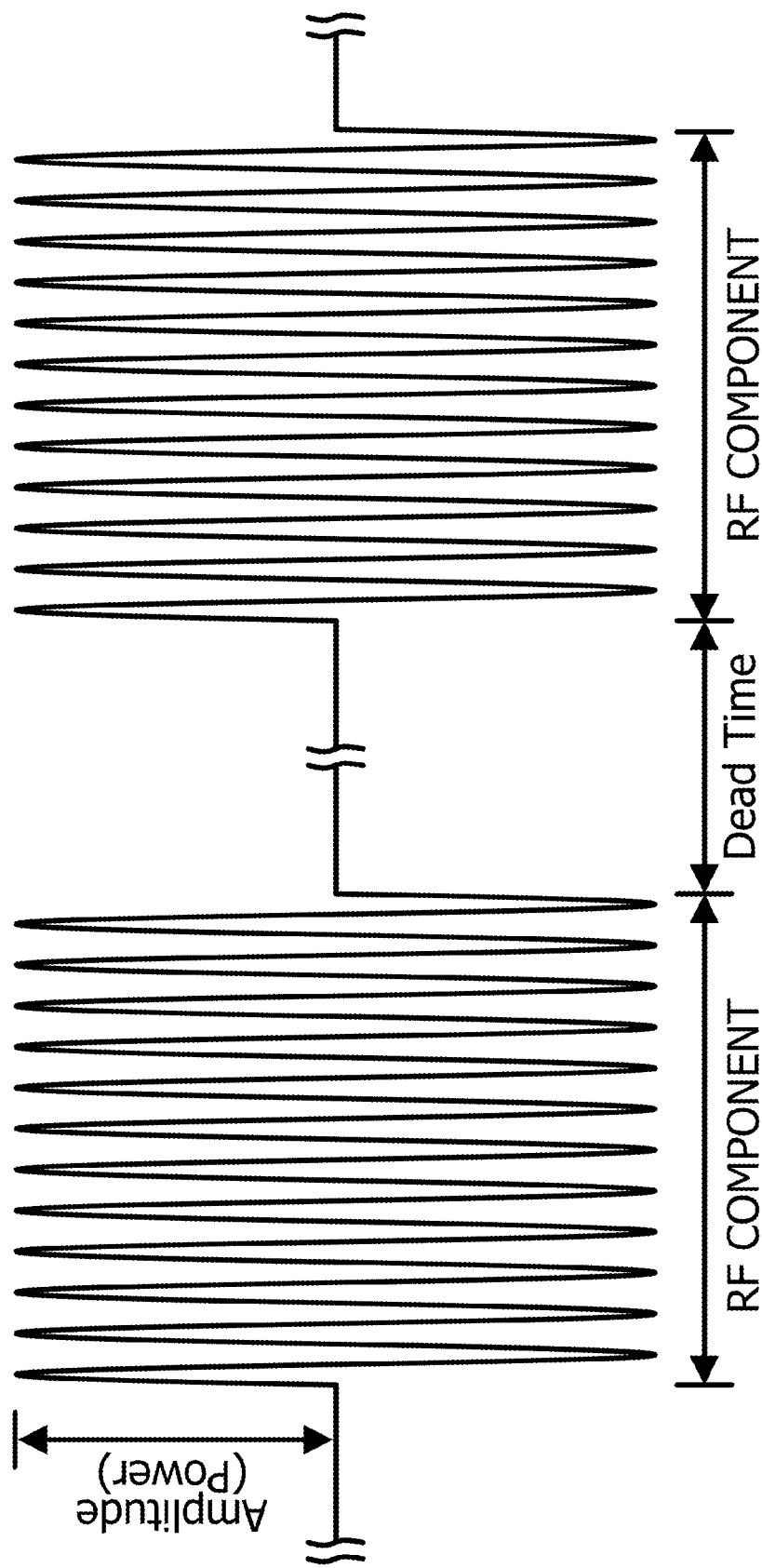
Figure 3:
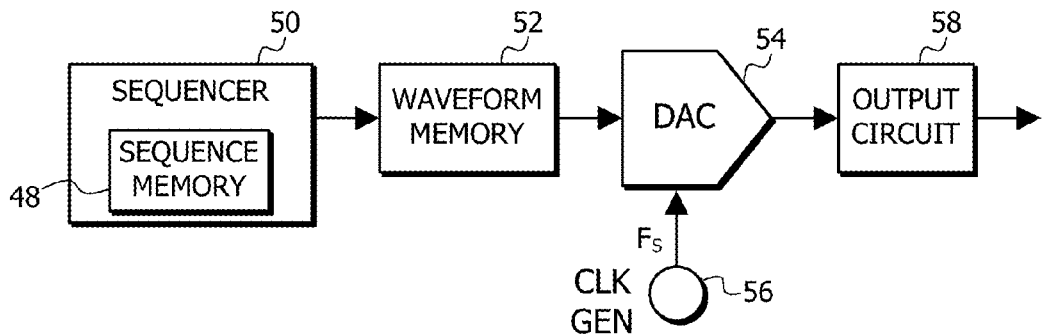
FIG. 3 is a block diagram of a conventional waveform generation circuit used in an arbitrary waveform generator.
Figure 4:
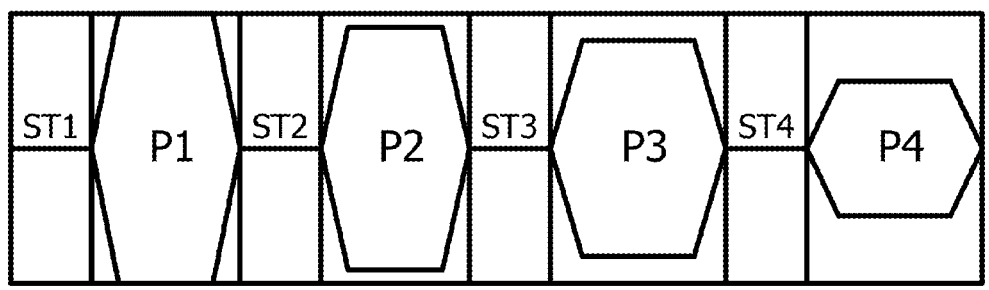
FIG. 4 shows component data of the simplified radar signal stored in a waveform memory of a conventional waveform generation circuit.
Figure 7:
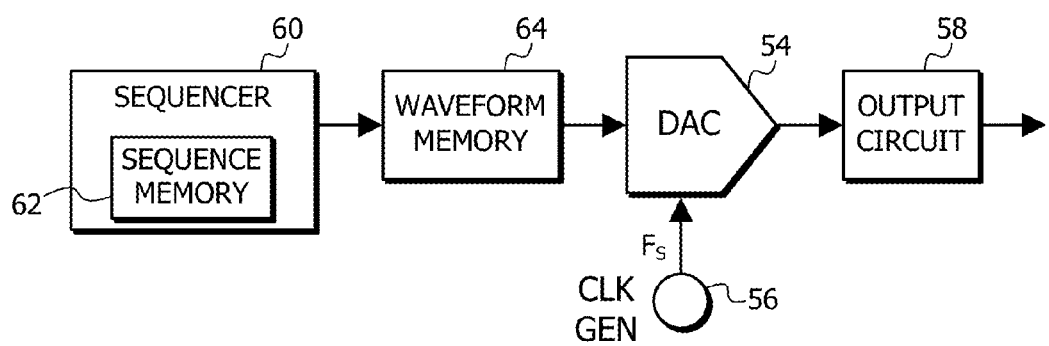
FIG. 7 is a block diagram of an embodiment of a waveform generation circuit according to the present invention.
Figure 8:
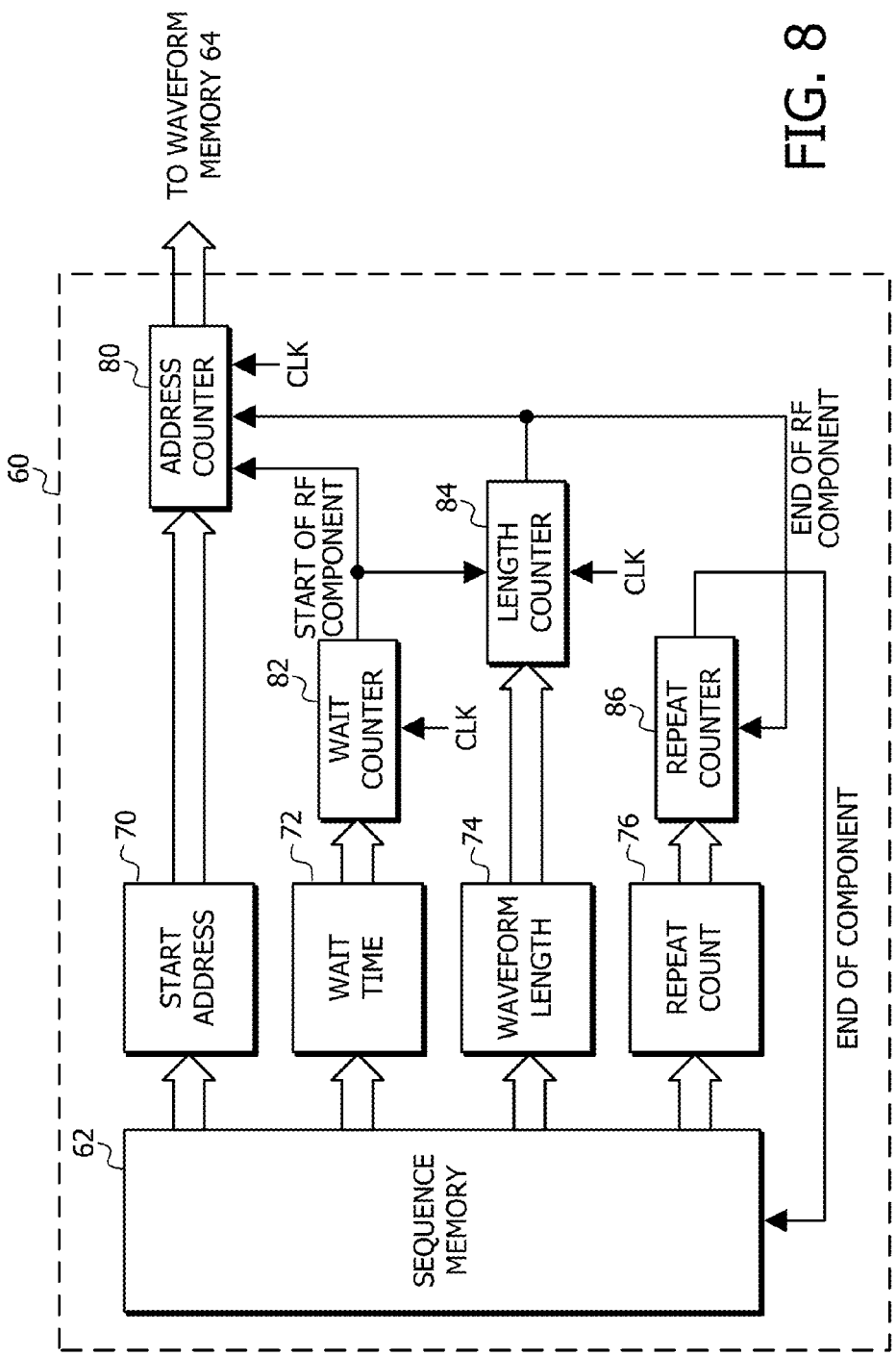
FIG. 8 is a detailed block diagram of an embodiment of a sequencer including a sequence memory according to the present invention.
Figure 9:
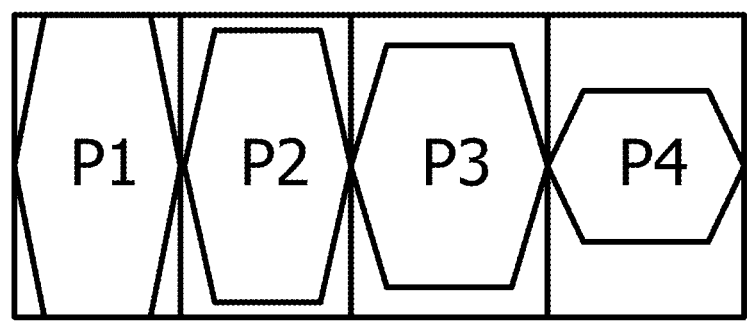
FIG. 9 shows waveform data of signal components stored in a waveform memory according to the present invention.

FIG. 7 is a block diagram of an embodiment of the waveform generation circuit 30 of FIG. 6 according to the present invention. The present invention will described in relation to a radar signal pulse train but it should be understood that any signal requiring dead time between active portions of a signal may be implemented with this invention. Note that the blocks in FIG. 7 corresponding to those in FIG. 3 have the same reference numbers. The embodiment of the present invention has a waveform memory 64 that stores the waveform data of signal components (RF components) P1 to P4 but not the waveform data of the dead time T1 to T4 between the signal components P1 to P4 as shown in FIG. 9. The present invention reduces the waveform data size by removing the requirement for waveform data representing the dead time in the waveform data. The improved data sequence control can generate the dead time without the specific requirement of storing waveform data related to the dead time.

Figure 10:
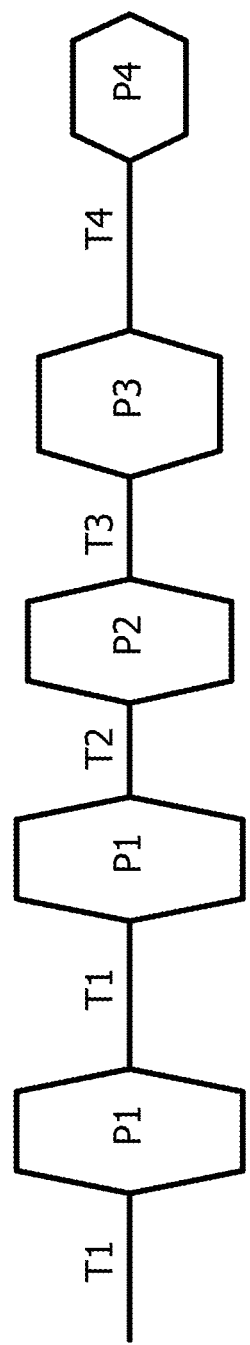
FIG. 10 shows an example of a pulse train such as a radar signal generated by the embodiment according to the present invention.
Figure 12:
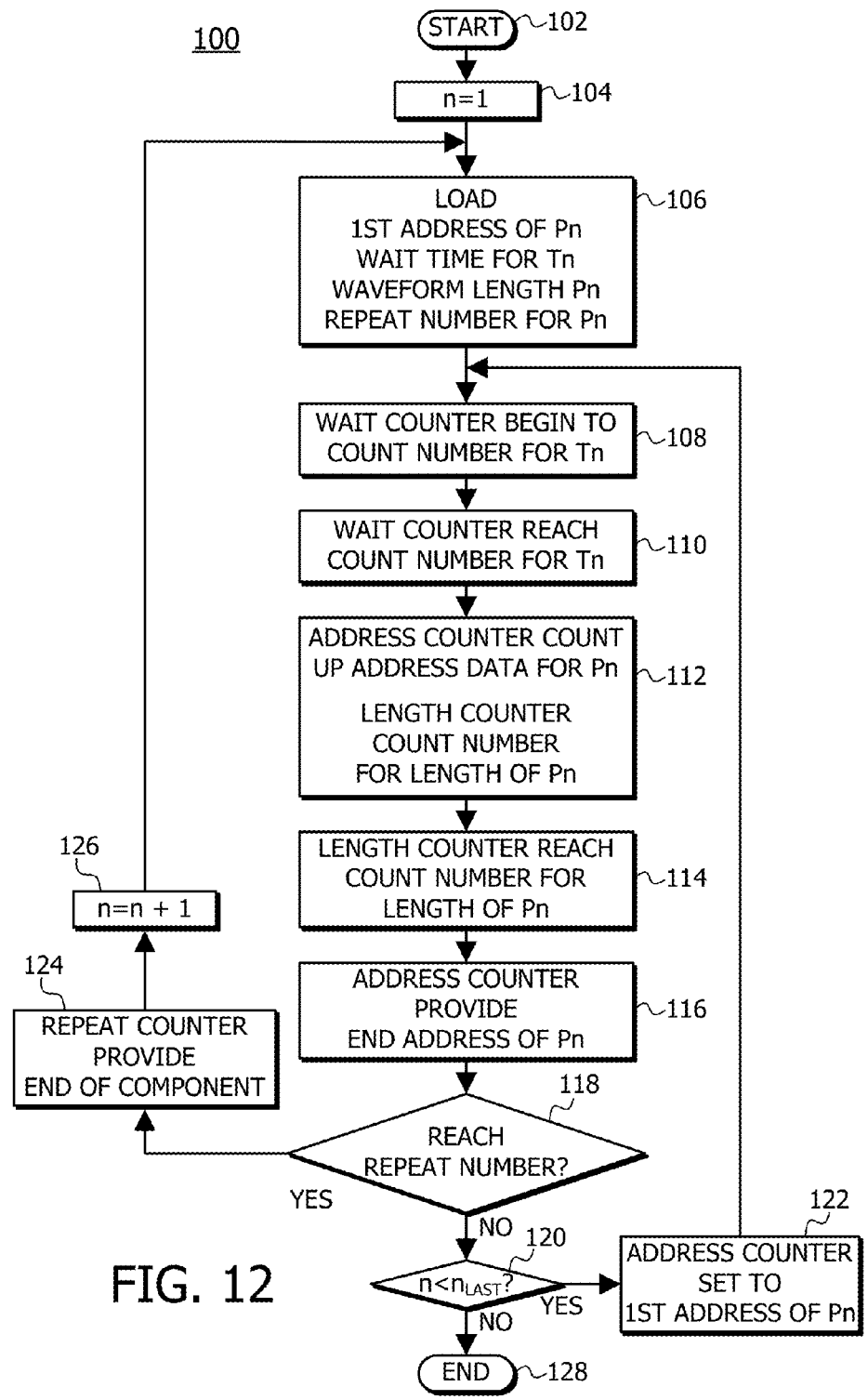
FIG. 12 is a flow diagram of the embodiment according to the present invention.

FIG. 10 shows an example of a pulse train such as a radar signal generated by the embodiment according to the present invention wherein T1 and P1 are repeated twice. FIG. 11 shows an example of a sequence table that the sequence memory 62 may store. FIG. 12 is a flow diagram of the embodiment according to the present invention.

The waveform data of signal components, such as the representative radar signal in FIG. 10, are stored in waveform memory 64 and provided to a digital to analog converter (DAC) 54 under the sequence control of a sequencer 60 including a sequence memory 62. The DAC 54 receives a sampling clock Fs from a clock generator 56 that defines the sampling rate. The DAC 54 provides an analog waveform signal to an output circuit 58 that has re-construction filters, amplifiers and attenuators to obtain an analog signal having desired bandwidth and amplitude. The CPU 20 controls operation of the blocks of the waveform generation circuit 30.

The sequence memory 62 contains sequence control data as represented by the sequence table for generating the waveform output signal (radar signal) of FIG. 10. In FIG. 12, the generation of the pulse train is initiated as shown in step 102. In step 104, an integer index is used for Tn or Pn with the integer "n"=1, 2, 3, 4 . . . and the default value of "n" set to 1.

Four registers 70, 72, 74 and 76 temporally stores the sequence control data from the sequence memory 62 before the data are provided to respective counters 80, 82, 84 and 86. The sequence control data stored in registers 70, 72, 74 and 76 are loaded into counters 80, 82, 84 and 86 (step 106). The sequence control data of the first address data of P1 is loaded into address counter 80. The sequence control data of wait time data for T1 is loaded into wait time counter 82. The sequence control data of signal component length data for P1 is loaded into signal component length counter 84. The sequence control data of repeat number data for P1 is loaded into repeat counter 86. The counters 80, 82 and 84 receive the sampling clock Fs from the clock generator 56. The wait counter 82 begins to count sampling clock representing the dead time (T1) specified by the wait time data (step 108).

The wait counter 82 controls each of the dead times T1 to T4 that has no signal component by counting the sampling clock. Note that the rate of the sampling clock is sufficiently fast to adjust the dead time in high resolution. During the incrementing of the wait counter, the initial address of P1 provides the address to the waveform memory 64 for the output of the initial waveform data of P1 as the dead time data. When the wait counter 82 reaches the count number specified by the wait time data for T1 (step 110), it provides a "Start of Signal Component" signal to the address and signal component length counters 80 and 84. The address counter 80 begins incrementing addresses in response to the sampling clock that are provided to the waveform memory for outputting waveform data representative of P1. The signal component length counter 84 begins to count the number of clocks of the sampling clock. The signal component length counter 84 continues counting the clocks cycles of the sampling clock until the count number specified by the signal component length (i.e. duration) data for P1 is reached (step 112). When the signal component length counter 84 reaches the terminal count number specified by the signal component length of P1 (step 114), it provides an "End of Signal Component" signal to the address counter 80 and the repeat counter 86. The address counter 80 receives the "End of Signal Component" signal from the signal component length counter 84 and then shows the end address of P1 (step 116). The repeat counter 86 also receives the "End of Signal Component" signal from the signal component length counter 84 which increments the repeat counter by 1.

At this time, if the repeat counter 86 is set to a specific repeat count number, such as two or more (NO at step 118) and n is less the last n (i.e. $n_{LAST}$ is four in this example at step 120), the address counter 80 again is set to the first address of P1 (step 122), and counting registers in the wait time counter 82 and the signal component length counter 84 are reset to their initial values. In this example, the repeat count for P1 is set to two as shown in FIG. 10. Then, the process returns to the step 108. When the wait counter 82 again reaches the count number specified by the wait time data for T1 (step 110), it provides "Start of Signal Component" signal to the address and signal component length counters 80 and 84. The address counter 80 begins to increment the address data for P1 and the signal component length counter 84 begins to count clock cycles of the sampling clock up to the count number specified by the signal component length data for P1 (step 112). When the signal component length counter 84 reaches the count number specified by the signal component length of P1 (step 114), the address counter 80 receives the "End of Signal Component" signal from the signal component length counter 84 and again shows the end address of P1 (step 116). The repeat counter 86 also receives the "End of Signal Component" signal from the signal component length counter 84 which increments the repeat counter 86 by 1. Incrementing the repeat counter by two matches the count of the repeat number data (YES at the step 118) which causes the repeat counter 84 to provide an "End of Component" signal (step 124) to the sequence memory.

Then, n is increases by one (step 126) and the process returns to the step 106. At the step 106, the first address data of P2, a wait time data for T2, a signal component length data for P2, a repeat number data for P2 from the sequence memory 62 are loaded to the address counter 80, the wait time counter 82, the signal component length counter 84, and the repeat counter 86 via the respective registers 70, 72, 74 and 76. In this embodiment, the repeat number for P2 is one. When the wait counter 82 reaches the count number specified by the wait time data for T2 (step 110), it provides "Start of Signal-Component" signal to the address counter 80 and the signal component length counter 84. The address counter 80 begins incrementing addresses in response to the sampling clock that are provided to the waveform memory for outputting waveform data representative of P2. The signal component length counter 84 begins to count the number of clocks of the sampling clock. The signal component length counter 84 counts the clocks cycles of the sampling clock until the count number specified by the signal component length (i.e. duration) data for P2 is reached (step 112). When the signal component length counter 84 reaches the count number specified by the signal component length of P2 (step 114), the address counter 80 receives the "End of Signal Component" signal from the signal component length counter 84 and again shows the end address of P1 (step 116). The repeat counter 86 also receives the "End of Component" signal from the signal component length counter 84 which increments the repeat counter 86 by 1. Incrementing the repeat counter by one matches the count of the repeat number data (YES at the step 118) which causes the repeat counter 84 to provide an "End of Component" signal (step 124) to the sequence memory. Then, n is increases by one (step 126) and the process returns to the step 106. Similar operations are conduct on the dead times of T3 and T4, and signal components of P3 and P4. As described above, a desired RF pulse train suitable for a radar signal can be generated by setting the wait times of T1 to T4.

The magnitude of the dead time need not be zero but can be a non-zero value. Further, the magnitude of the dead time need not be the first waveform record of the active signal. The present invention may be implemented with the sequencer providing a value for the dead time, which may be a non-zero value. Instead of incrementing addresses using the address counter, the sequence memory may contain memory address locations of the waveform memory that are readout of the sequence memory using the sampling clock and provided to the waveform memory. Various elements of the sequencer and/or sequencer memory may be implemented as a system resource, such as the sequencer memory being part of the memory 22 and the wait counter being implemented in the CPU 20.

It should be appreciated that variations and modifications may be made without departing from the principles of the invention as set forth in the following claims. The functions described in this disclosure can be implemented by various means, including both software and hardware-based implementations, or any combination thereof.

What is claimed is:

1. A waveform generation circuit for an arbitrary waveform generator comprising:
   a clock generator for generating a sampling clock;
   a waveform memory for storing data of one or more signal components of an output waveform signal;
   a digital to analog converter for converting the data of the signal components from the waveform memory as the output waveform signal;
   a sequencer having a sequence memory for storing sequence control data representing one or more signal components and related dead times;
   an address counter receiving sequence control initial address data of a selected one of the signal components and providing the initial address to the waveform memory;
   a wait counter receiving sequence control wait time data for the dead time of a selected signal component and counting the sampling clock until a terminal count of the wait time data is reached during which the waveform memory outputs data associated with the initial address of the signal component and generating a signal to initiate incremental addresses from the address counter to the waveform memory for the selected signal component data; and
   a signal component length counter receiving sequence control signal component length data and the incremental address initiate signal for counting the sampling clock for the duration of the selected signal component and generating a signal representing the end of the selected signal component of the output waveform signal and terminating the generation of addresses from the address counter, wherein the signal representing the end of the selected signal component initiates one of repeating the selected signal component and selecting sequence control data representing another signal component and related dead time.

2. The waveform generation circuit as recited in claim 1 further comprising:
   a repeat counter receiving sequence control repeat number data and the signal representing the end of one of the signal components that increments the repeat counter for generating a signal for terminating the signal component and related dead time when the incremented repeat counter equals the sequence control repeat number data or initiating the generation of the previous one of the signal components and related dead time when the incremented repeat counter is different from the sequence control repeat number data.

3. The waveform generation circuit as recited in claim 1 wherein the address counter receives the sequence control initial address data of one of the signal components from the sequence memory.

4. The waveform generation circuit as recited in claim 1 wherein the wait counter receives the sequence control wait time data of one of the signal components from the sequence memory.

5. The waveform generation circuit as recited in claim 1 wherein the signal component length counter receives the sequence control length data of one of the signal components from the sequence memory.

6. The waveform generation circuit as recited in claim 1 further comprising:
   registers for receiving each of the sequence control initial address data, the sequence control wait time data, the sequence control signal component length data from the sequence memory and providing the sequence control initial address data, the sequence control wait time data, and the sequence control signal component length data to their respective address counter, wait time counter, and signal component length counter.

7. The waveform generation circuit as recited in claim 2 wherein the repeat counter receives the sequence control repeat number data of one of the signal components from the sequence memory.

8. The waveform generation circuit as recited in claim 7 further comprising:
   a register for receiving the sequence control repeat number data from the sequence memory and providing the sequence control repeat number data to the repeat counter.

9. A method for controlling the sequence of waveform generation used for an arbitrary waveform generator comprising steps of:
   storing waveform data of one of more signal components of an output waveform signal in a waveform memory;
   providing sequence control data on one of the signal components from a sequence memory to an address counter, a wait counter and a signal component length counter;
   counting a sampling clock with the wait counter for a wait time representing a dead time associated with a selected signal component based on a sequence control data wait time while the address counter provides an initial address of the waveform data of the selected signal component to a waveform memory;
   providing a start signal from the wait counter to the address and signal component length counters when a terminal count based on the sequence control data wait time for the wait counter is achieved;
   incrementing addresses from the address counter to the waveform memory in response to the sampling clock after the address counter receives the start signal;
   counting the sampling clock with the signal component length counter representing the signal component length based on sequence control data signal component length after the signal component length counter receives the start signal;
   providing an end signal from the signal component length counter when a terminal count based on the sequence control data signal component length is achieved; and
   providing sequence control data from the sequence memory to the address, wait and signal component length counters another one of the signal components in response to the signal component length end signal.

10. The method for controlling the sequence of waveform generation as recited claim 9 further comprising steps of:
    providing a sequence control data repeat number from the sequence memory to a repeat counter for comparing with a count of signal component length end signals and providing sequence control data for the selected signal component when the sequence control data repeat number and the count of signal component length end signals are not equal and providing sequence control data for another of the signal components when the sequence control data repeat number and the count of signal component length end signals are equal.

11. The method for controlling the sequence of waveform generation as recited claim 9 wherein the address counter receives the initial address of the waveform data of the selected signal component as the sequence control data from the sequence memory.

12. The method for controlling the sequence of waveform generation as recited claim 9 wherein the wait counter receives a wait time data of the selected signal component as the sequence control data from the sequence memory.

13. The method for controlling the sequence of waveform generation as recited claim 9 wherein the signal component length counter receives a signal component length data of the selected signal component as the sequence control data from the sequence memory.

14. The method for controlling the sequence of waveform generation as recited claim 9 further comprising:
    providing the sequence control data from the sequence memory to the address, wait and signal component length counters through respective registers.

15. The method for controlling the sequence of waveform generation as recited claim 10 further comprising:
    providing the sequence control data repeat number from the sequence memory to the repeat counter through a register.

* * * * *